(12) United States Patent
Ou et al.

(10) Patent No.: US 7,872,861 B2
(45) Date of Patent: Jan. 18, 2011

(54) PORTABLE ELECTRONIC DEVICE

(75) Inventors: Tsung-Yuan Ou, Taoyuan County (TW); Chih-Shan Yeh, Taoyuan County (TW); Chin-Chung Shih, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 12/423,812

(22) Filed: Apr. 15, 2009

(65) Prior Publication Data
US 2010/0118487 A1 May 13, 2010

(51) Int. Cl.
*G06F 1/16* (2006.01)
(52) U.S. Cl. .................. 361/679.27; 361/679.26; 361/679.55; 361/679.56; 455/575.1
(58) Field of Classification Search ............ 361/679.06, 361/679.3, 679.56
See application file for complete search history.

(56) References Cited

U.S. PATENT DOCUMENTS

| | | | | |
|---|---|---|---|---|
| 5,548,478 | A * | 8/1996 | Kumar et al. | 361/679.27 |
| 6,366,453 | B1 * | 4/2002 | Wang et al. | 361/679.06 |
| 6,561,469 | B1 * | 5/2003 | Masuda et al. | 248/163.1 |
| 6,747,635 | B2 * | 6/2004 | Ossia | 345/169 |
| 6,929,224 | B1 * | 8/2005 | Masuda et al. | 248/176.3 |
| 7,187,364 | B2 * | 3/2007 | Duarte et al. | 345/168 |
| 7,385,150 | B1 * | 6/2008 | Siddiqui et al. | 200/5 A |
| 7,413,152 | B1 * | 8/2008 | Chen | 248/176.1 |
| 7,448,872 | B2 * | 11/2008 | Im | 439/10 |
| D590,825 | S * | 4/2009 | Liu | D14/341 |
| 7,561,443 | B2 * | 7/2009 | Todoroki et al. | 361/814 |
| 7,611,113 | B2 * | 11/2009 | Lai | 248/286.1 |
| 2002/0145846 | A1 * | 10/2002 | Helot et al. | 361/681 |
| 2003/0030971 | A1 * | 2/2003 | Duarte | 361/680 |
| 2003/0142474 | A1 * | 7/2003 | Karidis et al. | 361/683 |
| 2005/0002159 | A1 * | 1/2005 | Jeong | 361/683 |
| 2006/0183517 | A1 * | 8/2006 | Wang | 455/575.4 |
| 2006/0232921 | A1 * | 10/2006 | Brandenberg et al. | 361/683 |
| 2007/0058330 | A1 * | 3/2007 | Lin | 361/681 |
| 2007/0082695 | A1 * | 4/2007 | Yoon et al. | 455/550.1 |
| 2007/0105606 | A1 * | 5/2007 | Yoon et al. | 455/575.4 |
| 2007/0153452 | A1 * | 7/2007 | Harmon et al. | 361/679 |
| 2007/0184882 | A1 * | 8/2007 | Kim | 455/575.4 |
| 2008/0052874 | A1 | 3/2008 | Liu | |
| 2008/0174942 | A1 * | 7/2008 | Yang et al. | 361/680 |

(Continued)

FOREIGN PATENT DOCUMENTS

EP    1783984    5/2007

(Continued)

OTHER PUBLICATIONS

"Search Report of European counterpart application", issued on Jul. 23, 2009, p. 1-p. 4.

*Primary Examiner*—Jayprakash N Gandhi
*Assistant Examiner*—Anthony Q Edwards
(74) *Attorney, Agent, or Firm*—Jianq Chyun IP Office

(57) ABSTRACT

A portable electronic device has a lower body, an upper body, and a moving assembly installed between the parts. The moving assembly has a lower base fixed to the lower body, a middle base pivoted to the lower base along a first axis, and an upper base pivoted to the middle base along a second axis that is substantially paralleled to the first axis and slidably connected to the upper body.

6 Claims, 13 Drawing Sheets

U.S. PATENT DOCUMENTS

| | | | | |
|---|---|---|---|---|
| 2008/0304215 A1* | 12/2008 | Chiu | ............................ | 361/681 |
| 2009/0008518 A1* | 1/2009 | Shen | ........................ | 248/122.1 |
| 2009/0109616 A1* | 4/2009 | Lee | ........................ | 361/679.56 |
| 2009/0131128 A1* | 5/2009 | Kim | ........................ | 455/575.4 |
| 2009/0199361 A1* | 8/2009 | Kao et al. | ...................... | 16/225 |

FOREIGN PATENT DOCUMENTS

| | | |
|---|---|---|
| GB | 2434274 | 7/2007 |
| WO | 2007126213 | 11/2007 |

\* cited by examiner

PORTABLE ELECTRONIC DEVICE

CROSS-REFERENCE TO RELATED APPLICATION

This application claims the priority benefit of Taiwan application serial No. 97143747, filed on Nov. 12, 2008. The entirety of the above-mentioned patent application is hereby incorporated by reference herein and made a part of this specification.

BACKGROUND OF THE INVENTION

1. Field of the Invention

The present application relates to a portable electronic device. More particularly, the present application relates to a portable electronic device capable with two bodies.

2. Description of Related Art

A portable electronic device is an electronic device which a user can carry around and operate on. The portable electronic device is usually small and light for the user to carry conveniently. The common portable electronic device is, for example, a mobile phone, a multimedia player, a personal digital assistant (PDA), a handheld game console, a handheld global positioning system, and a notebook. The present portable electronic devices mostly apply a folding or a sliding type design, so the size of the portable electronic device may be reduced when the two bodies are stacked and expanded when the two bodies are extended.

SUMMARY OF THE INVENTION

The present application relates to a portable electronic device having a plurality of operation modes.

The present invention relates to a portable electronic device including a lower body, an upper body, and a moving assembly installed between the upper body and the lower body. The moving assembly includes a lower base fixed to the lower body, a middle base pivoted to the lower base along a first axis, and an upper base pivoted to the middle base along a second axis that is substantially paralleled to the first axis. Here, the upper base is slidably connected to the upper body.

In light of the foregoing, in the present application, the upper body may be under a close mode, a first open mode, and a second open mode relative to the lower body through the moving assembly.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
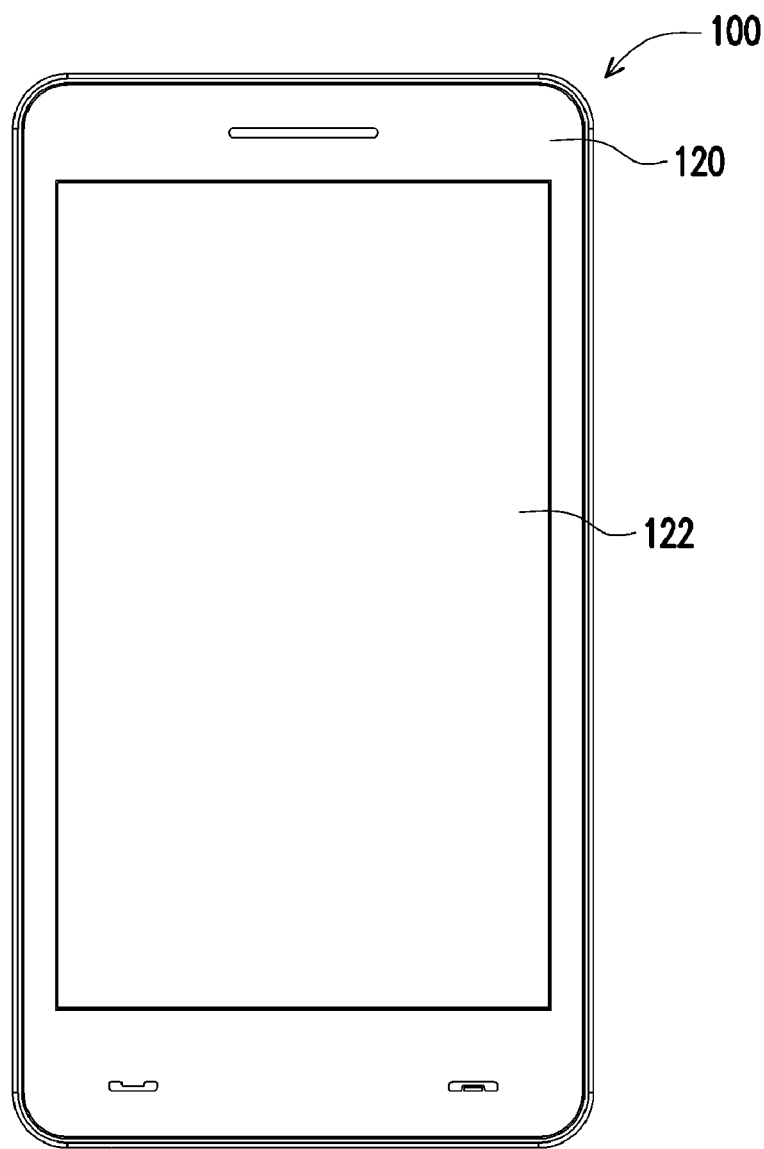
FIG. 1A and FIG. 1B are respectively a top view and a side view of a portable electronic device under a close mode according to one embodiment of the present invention.
Figure 1B:
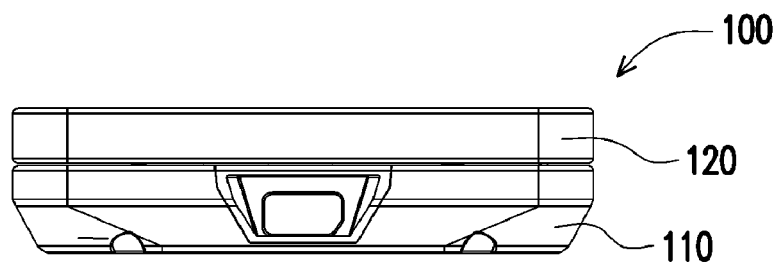
Figure 2:
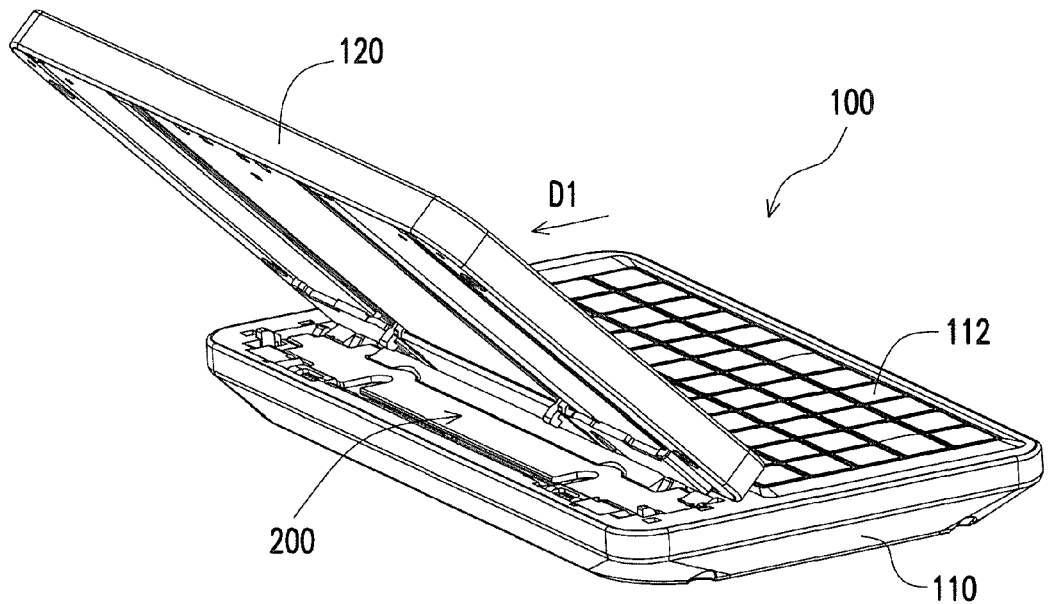
FIG. 2 is a perspective view of the portable electronic device in FIG. 1A under a first open mode.
Figure 3:
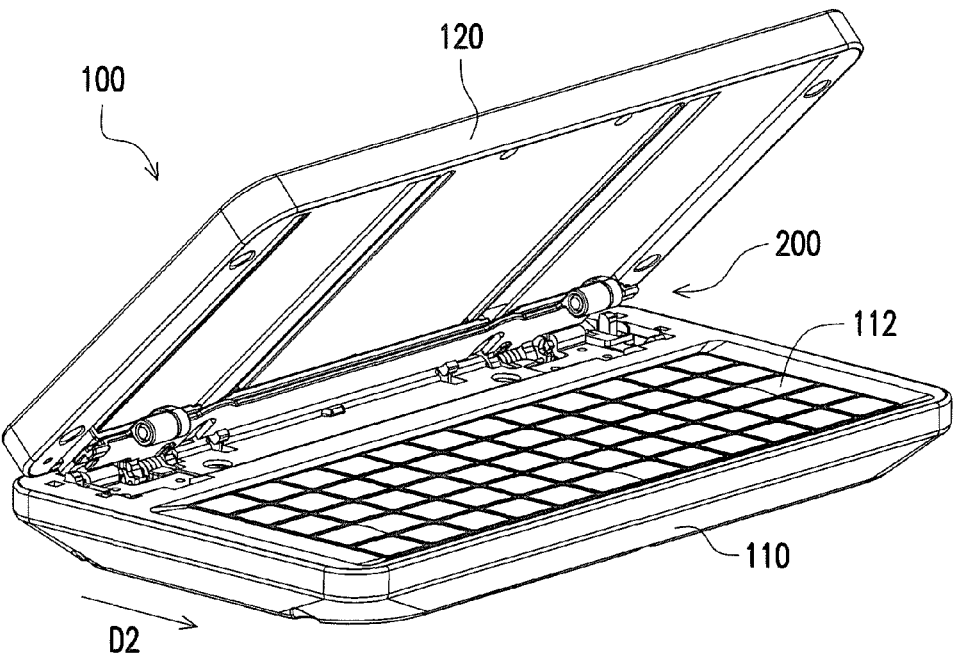
FIG. 3 is a perspective view of the portable electronic device in FIG. 1A under a second open mode.

FIG. 1A and FIG. 1B are respectively a top view and a side view of a portable electronic device under a close mode according to one embodiment of the present invention. FIG. 2 is a perspective view of the portable electronic device in FIG. 1A under a first open mode. FIG. 3 is a perspective view of the portable electronic device in FIG. 1A under a second open mode. Referring to FIG. 1A, FIG. 1B, FIG. 2 and FIG. 3, a portable electronic device 100 of the present embodiment has a lower body 110, an upper body 120, and a moving assembly 200. Herein, the moving assembly 200 is disposed between the lower body 110 and the upper body 120. Hence, the lower body 110 and the upper body 120 are under a close mode in FIG. 1A and FIG. 1B, a first open mode in FIG. 2, or a second open mode in FIG. 3.

When the moving assembly 200 is under the close mode, the upper body 120 stacks on the lower body 110. In the process of changing the moving assembly 200 from the close mode to a first open mode, the upper body 120 tilts relative to the lower body 110 through the moving assembly by shifting the upper body 120 along a first direction D1 and rotating the upper body 120 relative to the lower body 110. In the process of changing the moving assembly 200 from the close mode to a second open mode, the upper body 120 tilts relative to the lower body 110 through the moving assembly by shifting the upper body 120 along a second direction D2 and rotating the upper body 120 relative to the lower body 110. Here, the first direction D1 is opposite to the second direction D2.

Moreover, the upper body 120 has a display module 122, and the display module 122 may also include a touch panel to provide touch-control function. The lower body 110 has a keyboard module 112; however, in another embodiment not shown here, the lower body 110 may include a touch panel to replace the aforementioned keyboard module 112.

Figure 4:
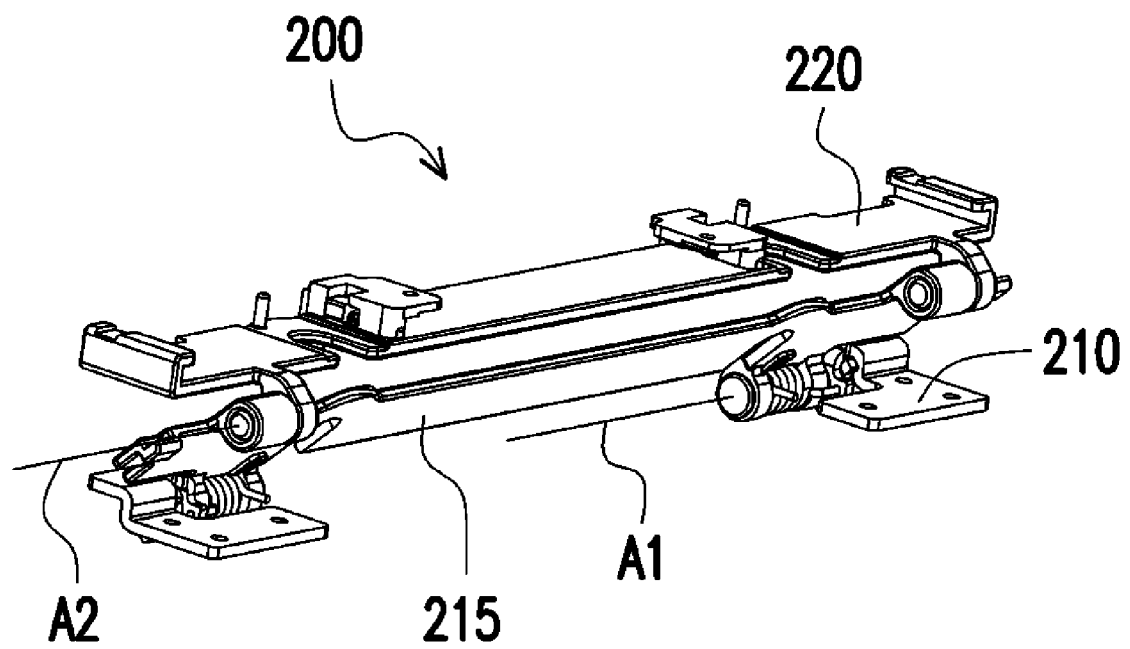
FIG. 4 is a perspective view of a moving assembly in FIG. 2.
Figure 5:
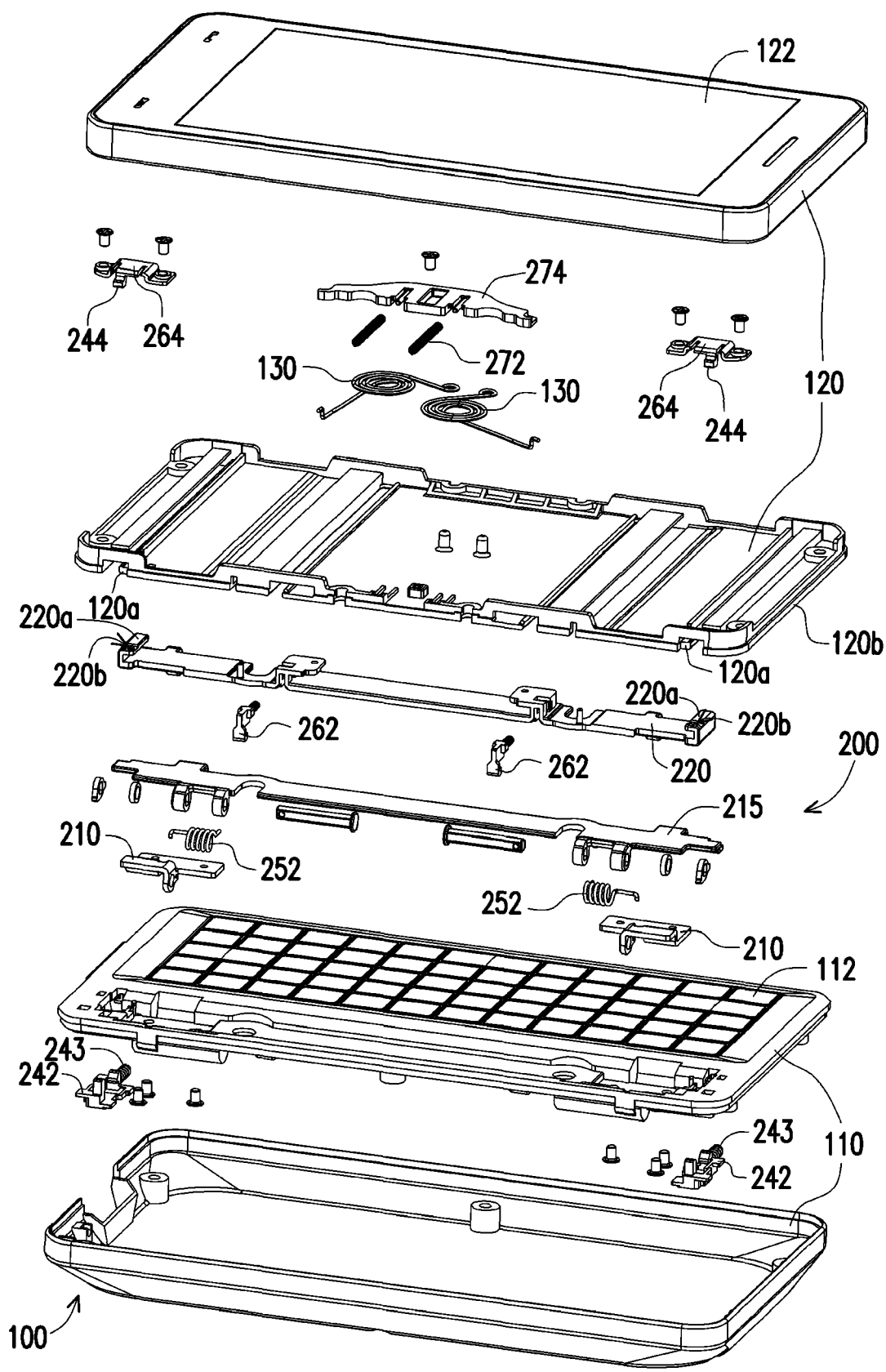
FIG. 5 is an exploded view of the portable electronic device in FIG. 1A.

FIG. 4 is a perspective view of the moving assembly in FIG. 2. FIG. 5 is an exploded view of the portable electronic device in FIG. 1A. Referring to FIG. 4 and FIG. 5, the moving assembly 200 includes a lower base 210, a middle base 215, and an upper base 220. The lower base 210 is fixed to the lower body 110, the middle base 215 is pivoted to the lower base 210 along a first axis A1, and the upper base 220 is pivoted to the middle base 215 along a second axis A2 that is substantially paralleled to the first axis A1. The upper base 220 is then slidably connected to the upper body 120.

In the present embodiment, the lower base 210 is fixed to the lower body 110. In addition, also in the present embodiment, the upper body 120 has a set of sliding tracks 110a, and the upper base 220 has a set of sliding hooks 220a. Each of the sliding hooks 220a corresponds to the pair of sliding tracks 110a. The upper base 220 is slidably connected to the upper body 120 through the pair of sliding tracks 110a and the pair of sliding hooks 220a.

In the present embodiment, the portable electronic device 110 further includes a pair of torsion springs 130, as indicated in FIG. 5. The pair of torsion springs 130 is disposed between the upper body 120 and the moving assembly 200. More specifically, the pair of torsion springs 130 is disposed between a lower cover 120b of the upper body 120 and the upper base 220 of the moving assembly 200. With the pair of torsion springs 130, the upper body 120 and the moving assembly 200 directly perform relative semi-automatic sliding, and the lower body 110 and the upper body 120 also indirectly perform relative semi-automatic sliding.

Figure 6:
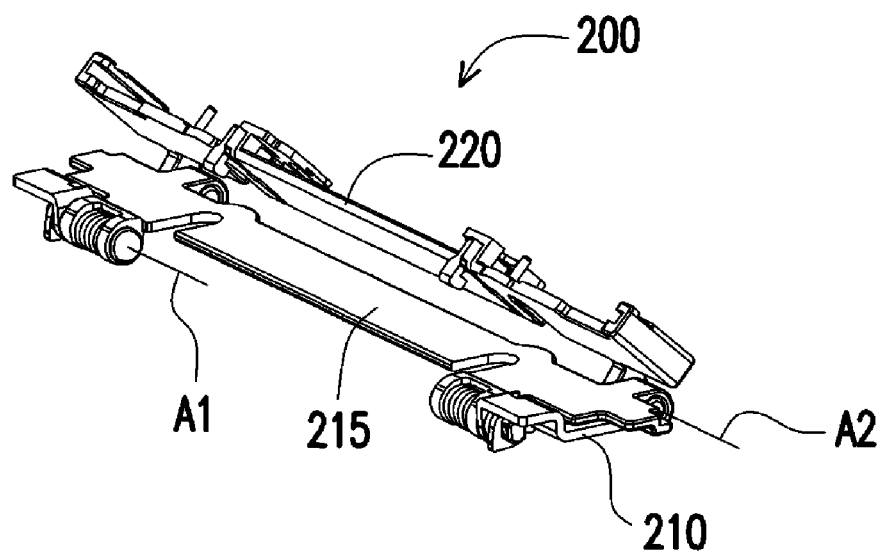
FIG. 6 and FIG. 7 are perspective views of the moving assembly in FIG. 2 taken at two different viewing angles under the first open mode.
Figure 7:
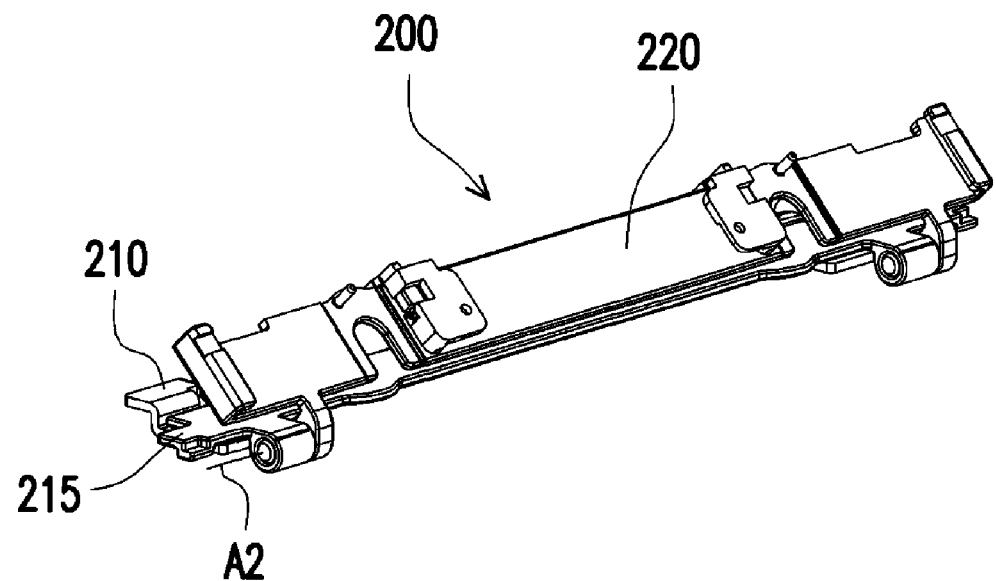

FIG. 6 and FIG. 7 are perspective views taken at two different viewing angles of the moving assembly in FIG. 2 under the first open mode. Referring to FIG. 2, FIG. 6 and FIG. 7, the upper body 120 is tilted relative to the lower body 110 by rotating the upper body 120 relative to the lower body 110 along the second axis A2 through the moving assembly 200.

Figure 8:
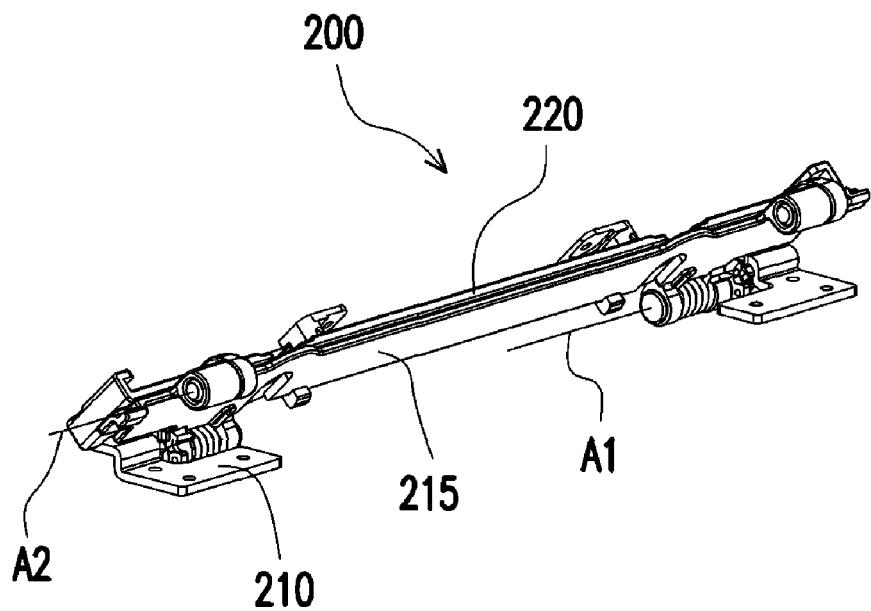
FIG. 8 and FIG. 9 are perspective views of the moving assembly in FIG. 2 taken at two different viewing angles under the second open mode.
Figure 9:
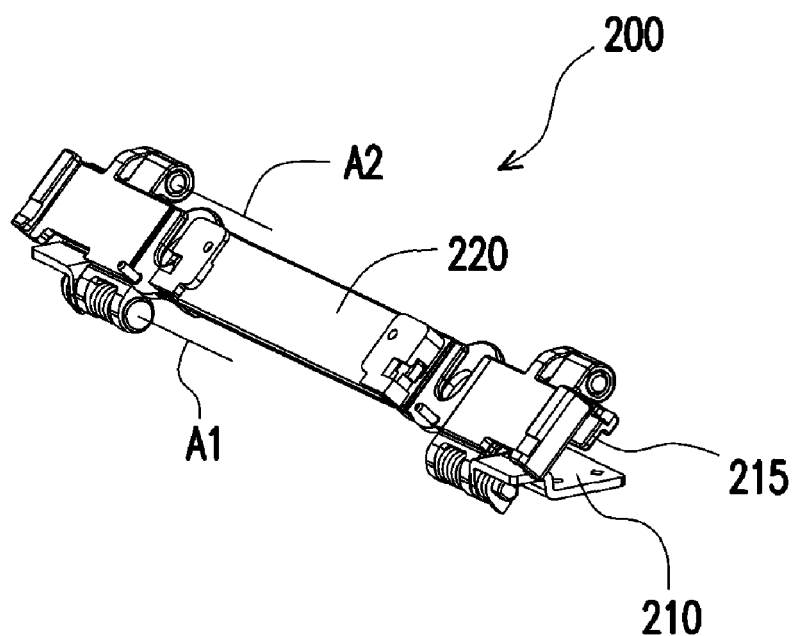

FIG. 8 and FIG. 9 are perspective views taken at two different viewing angles of the moving assembly in FIG. 2 under the second open mode. Referring to FIG. 3, FIG. 8 and FIG. 9, the upper body 120 is tilted relative to the lower body 110 by rotating the upper body 120 relative to the lower body 110 along the first axis A1 through the moving assembly 200.

Figure 10:
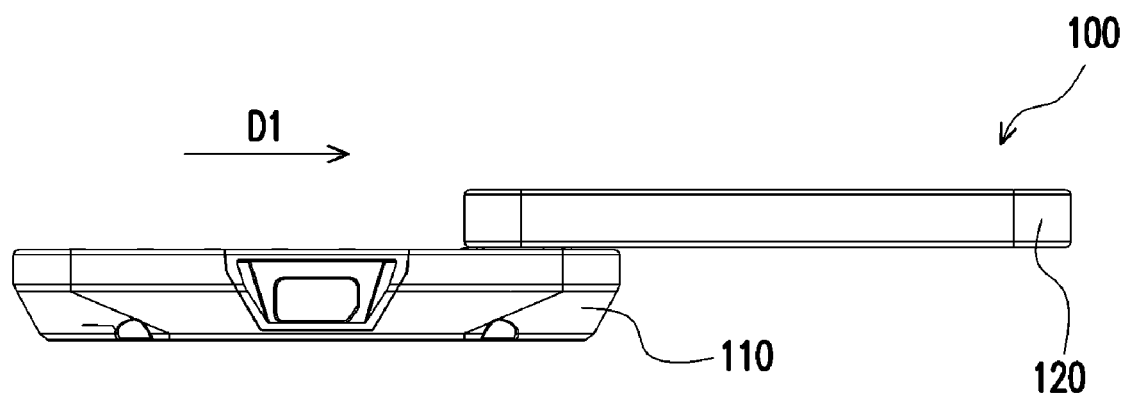
FIG. 10 is a side view of the lower body and the upper body in FIG. 1B in the process of changing from the close mode to the first open mode.
Figure 11:
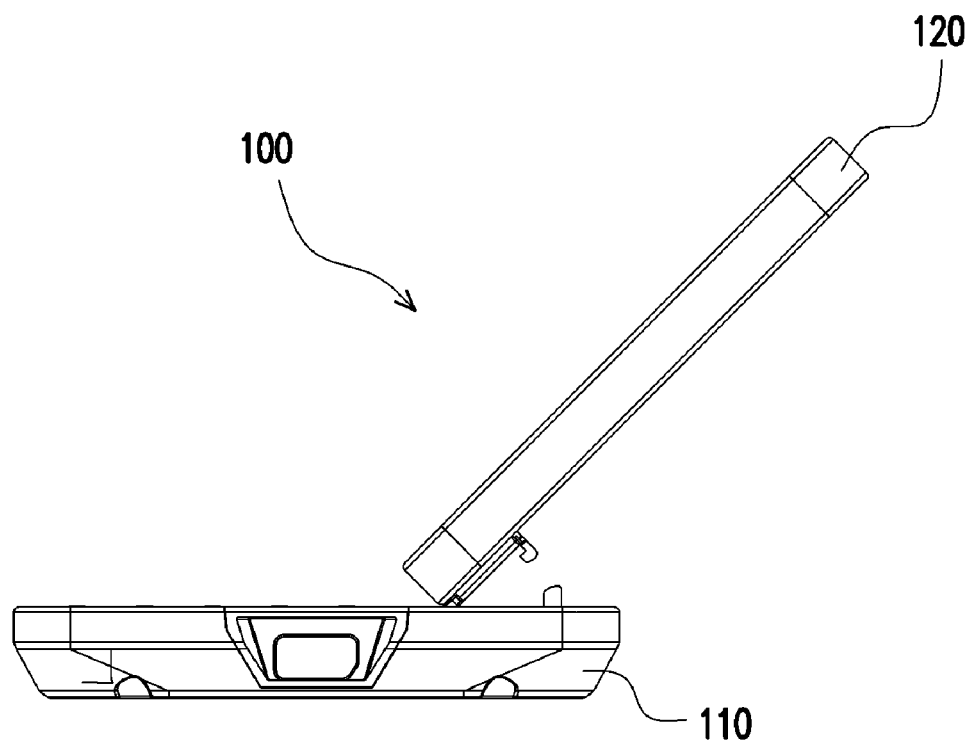
FIG. 11 is a side view of the lower body and the upper body in FIG. 5 in the process of changing from the close mode to the first open mode.

FIG. 10 is a side view of the lower body and the upper body in FIG. 1B in the process of changing from the close mode to the first open mode. FIG. 11 is a side view of the lower body and the upper body in FIG. 5 in the process of changing from the close mode to the first open mode. Referring to FIG. 1 and FIG. 10, through the moving assembly 200 in FIG. 2, the upper body 120 may shift a distance along the first direction D1 relative to the lower body 110, until the keyboard module 122 or a touch panel on the lower body 110 is exposed. Referring to FIG. 10 and FIG. 11, the upper body 120 is tilted relative to the lower body 110 by rotating the upper body 120 relative to the lower body 110 along the second axis A2 through the moving assembly 200.

Figure 12A:
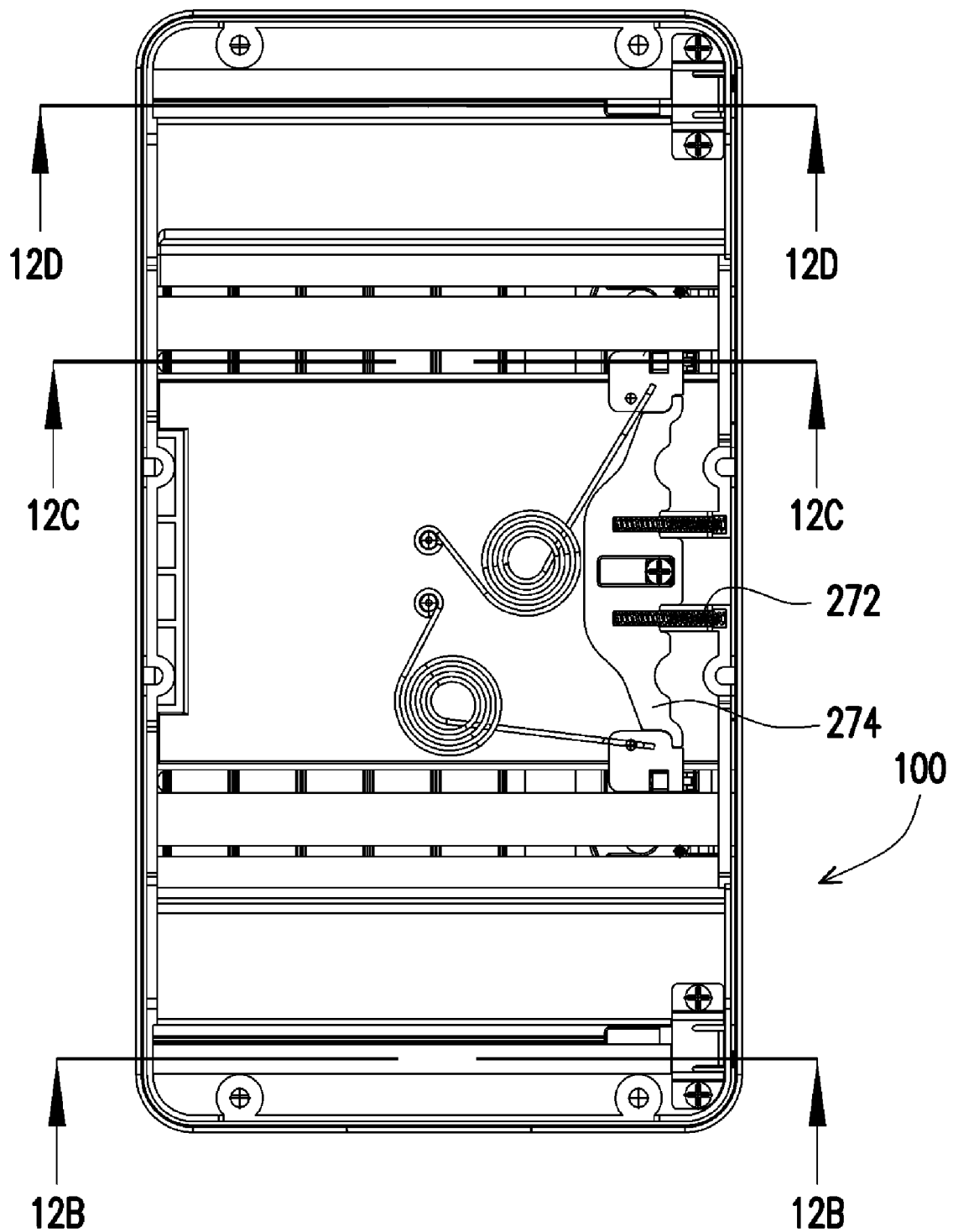
FIG. 12A is a top view of the portable electronic device in FIG. 1A under the close mode, and where the upper cover of the upper body is removed.
Figure 12B:
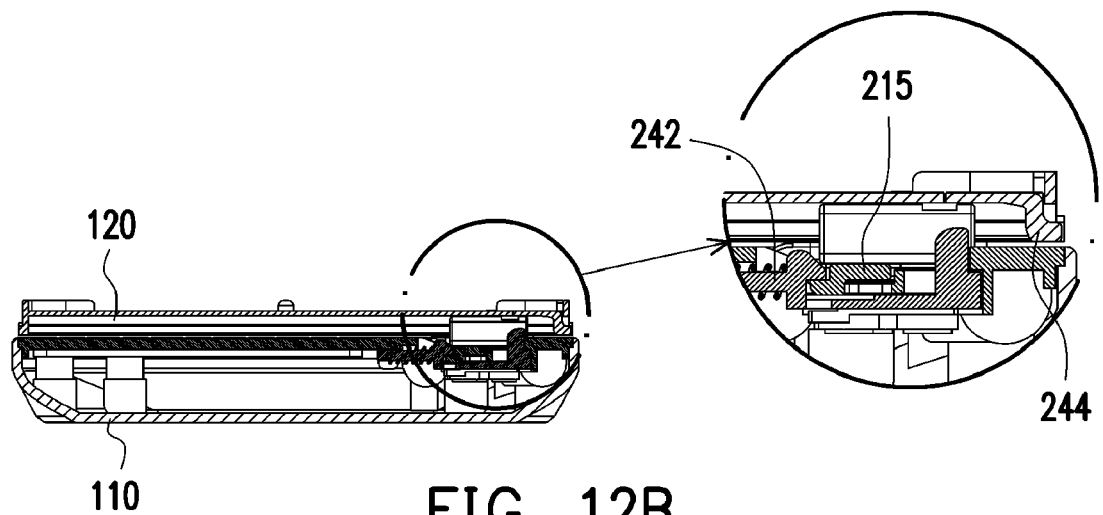
FIG. 12B is a cross-sectional view taken along line 12B-12B in FIG. 12A.

FIG. 12A is a top view of the portable electronic device in FIG. 1A under the close mode, and where the upper cover of the upper body is removed. FIG. 12B is a cross-sectional view taken along line 12B-12B in FIG. 12A. Referring to FIG. 5, FIG. 6, and FIG. 12B, in order to prevent the upper body 120 from rotating relative to the lower body 110 in the process of moving the upper body 120 relative to the lower body 110, that is, the middle base 215 will not rotate along the first axis A1 relative to the lower base 210, the moving assembly 200 further includes a plurality of lower latches 242 and a plurality of third elastic members 243. Here, the lower latches 242 are assembled with the third elastic members 243, so the lower latches 242 can be slidably connected to the lower body 110 to latch the middle base 215. In the present embodiment, the lower latches 242 respectively latch the two ends of the middle base 215.

To change the portable electronic device from the close mode in FIG. 1B to the second open mode in FIG. 3, the latching of the middle base 215 by the lower latches 242 has to be first relieved. Thus, referring to FIG. 5, the moving assembly 200 further includes a plurality of driver portions 244. The driver portions 244 are disposed on the lower cover 120b of the upper body 120 to push the lower latches 242 respectively, so that the lower latches 242 are not latched to the middle base 215.

Figure 13A:
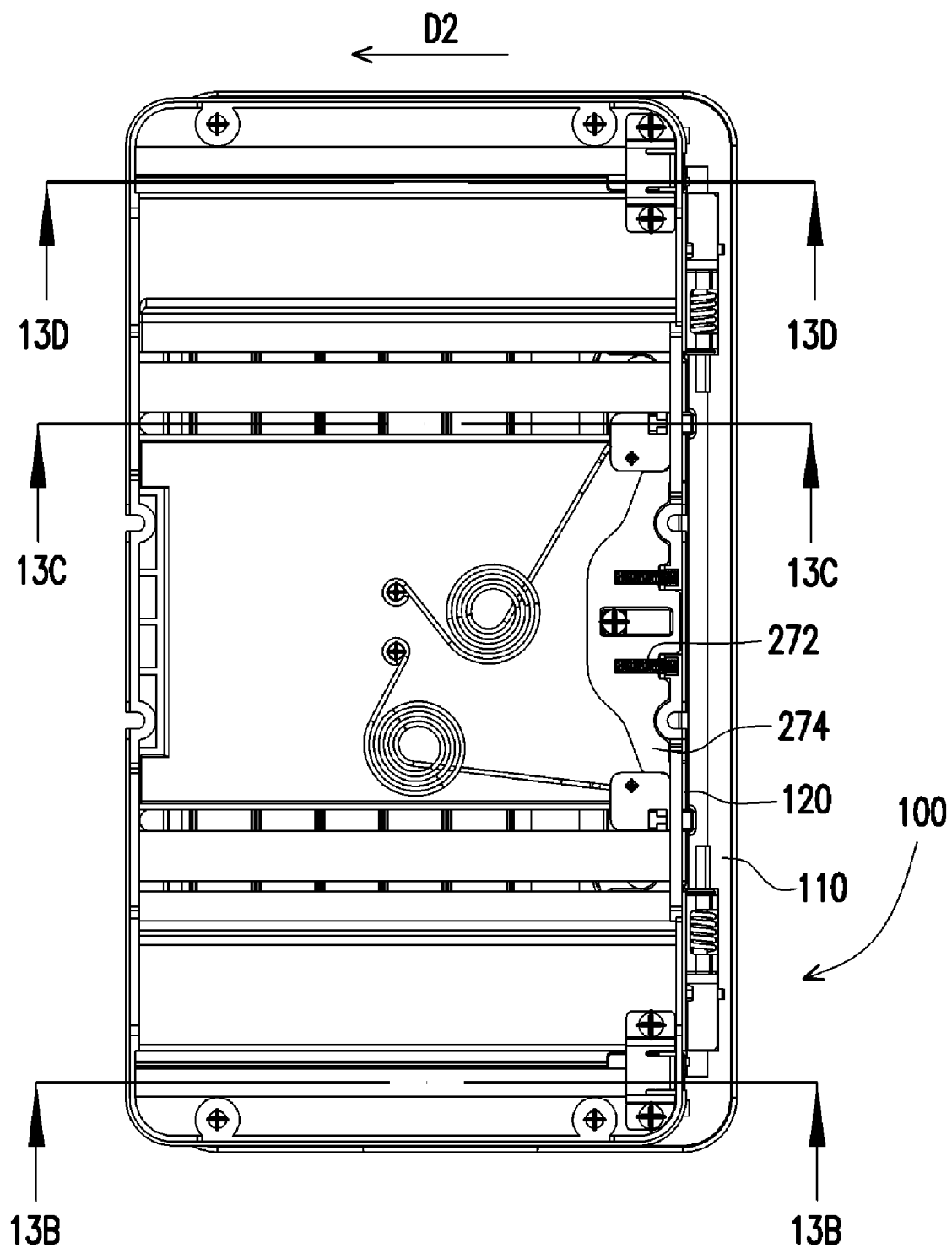
FIG. 13A is a top view of the portable electronic device in FIG. 12A in the process of changing from the close mode to the second open mode.
Figure 13B:
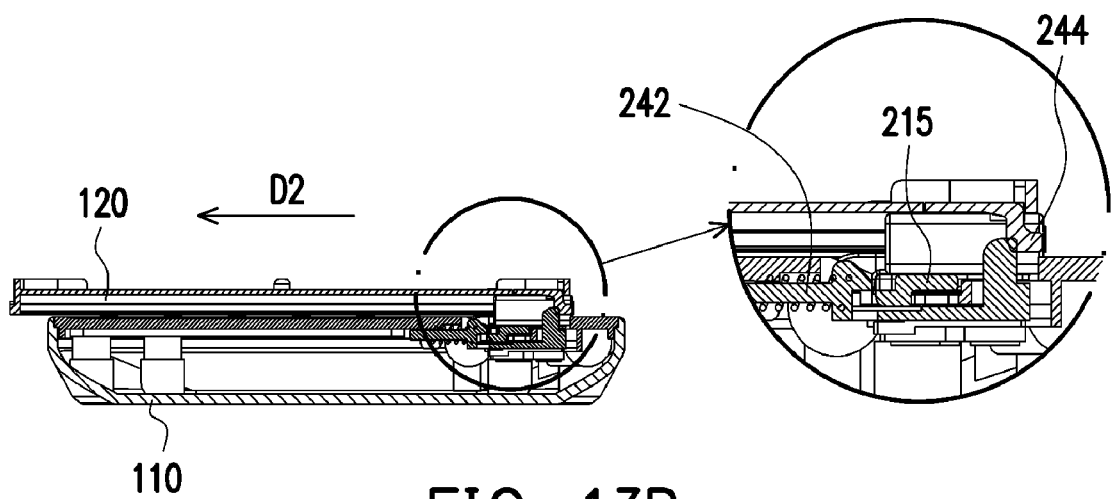
FIG. 13B is a cross-sectional view taken along line 13B-13B in FIG. 13A.

FIG. 13A is a top view of the portable electronic device in FIG. 12A in the process of changing from the close mode to the second open mode. FIG. 13B is a cross-sectional view taken along line 13B-13B in FIG. 13A. Referring to FIG. 12B and 13B, the latching of the middle base 215 and the lower body 110 by the lower latches 242 is relieved by the driver portions 244 through the movement of the upper body 120 relative to the lower body 110 along a second direction D2.

Figure 14A:
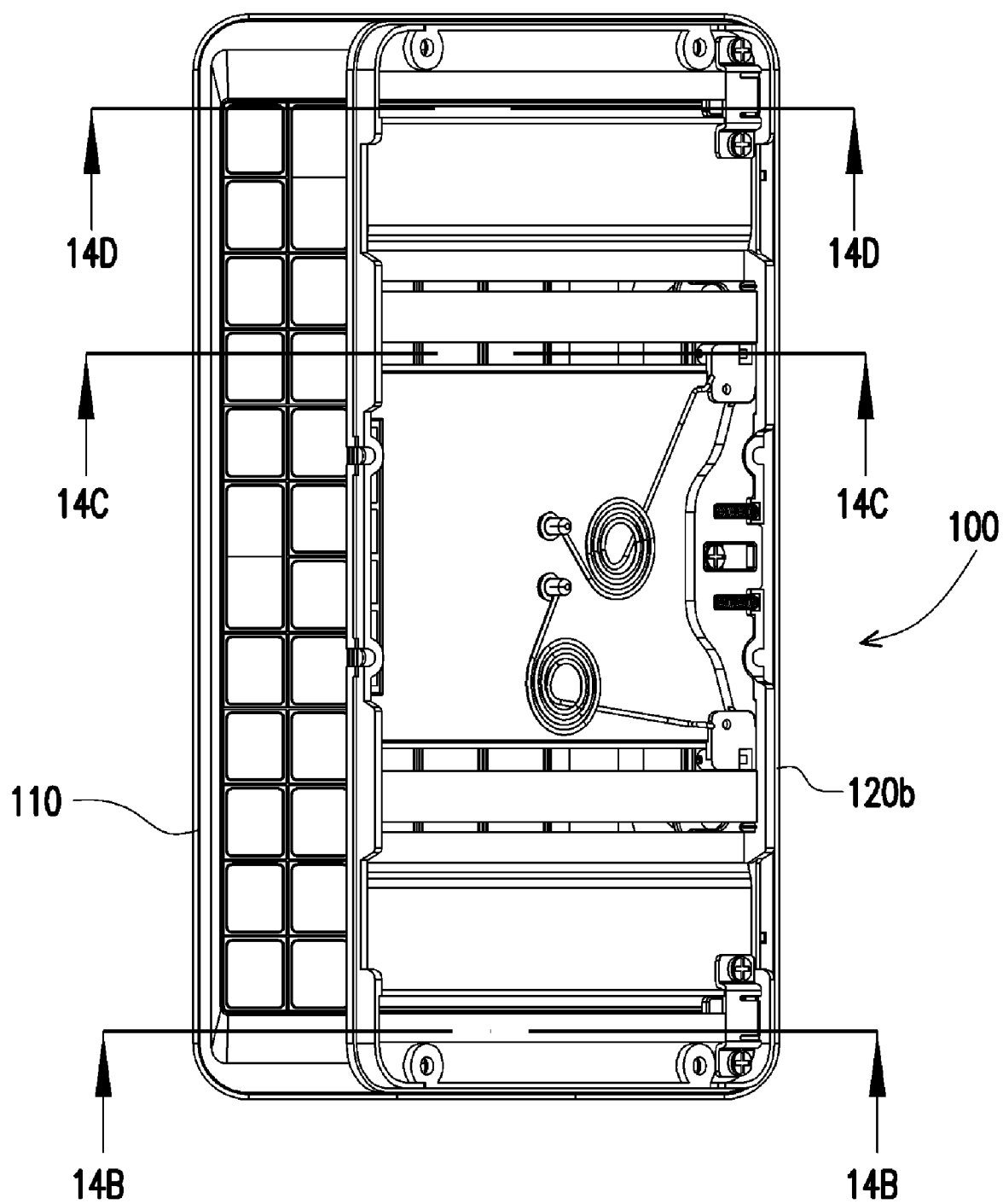
FIG. 14A is a top view of the portable electronic device in FIG. 12A in the process of changing from the close mode to the second open mode.
Figure 14B:
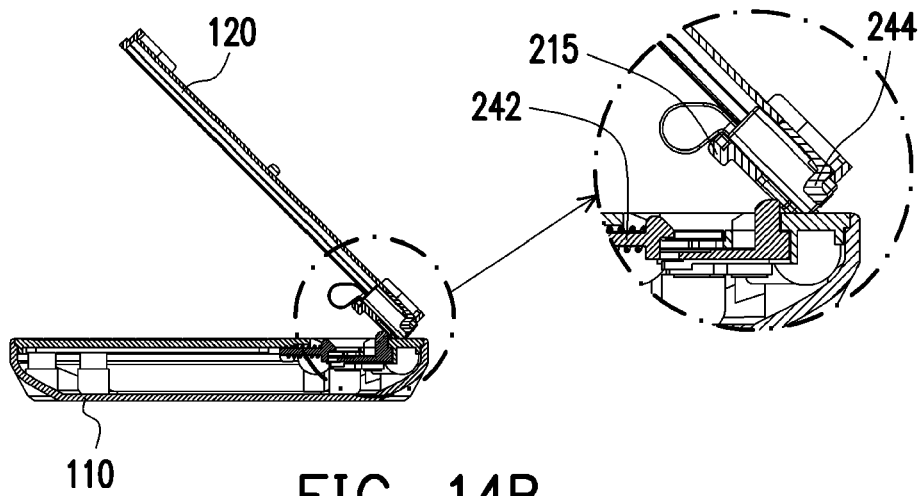
FIG. 14B is a cross-sectional view taken along line 14B-14B in FIG. 14A.

FIG. 14A is a top view of the portable electronic device in FIG. 12A in the process of changing from the close mode to the second open mode. FIG. 14B is a cross-sectional view taken along line 14B-14B in FIG. 14A. Referring to FIG. 13B and FIG. 14B, when the lower latches 242 are not latching the middle base 215, the upper body 120, the middle base 215, and the upper base 220 rotate relative to the lower body 110 and the lower base 210, such that the driver portions 244 are no longer in contact with the lower latches 242.

Referring to FIG. 5 and FIG. 8, the moving assembly 200 may includes a set of first elastic members 252. The first elastic members 252 are disposed between the lower base 210 and the middle base 215 to drive the middle base 215 to rotate along the first axis A1 relative to the lower base 210. Hence, referring to FIG. 13B and FIG. 14B, when the driver portions 244 are no longer in contact with the lower latches 242, the first elastic members 252 drive the middle base 215 with elasticity to rotate the middle base 215 along the first axis A1 relative to the lower base 210.

Referring to FIG. 5 and FIG. 8, in the process of rotating the middle base 215 and the upper base 220 along the first axis A1 relative to the lower base, the moving assembly 200 further includes a plurality of side latches 262 that are disposed on the upper base 220 to prevent the upper base 220 from rotating along the second axis A2 relative to the middle base 215. In the present embodiment, the side latches 262 are elastically and slidably connected to the upper base 220.

Figure 12C:
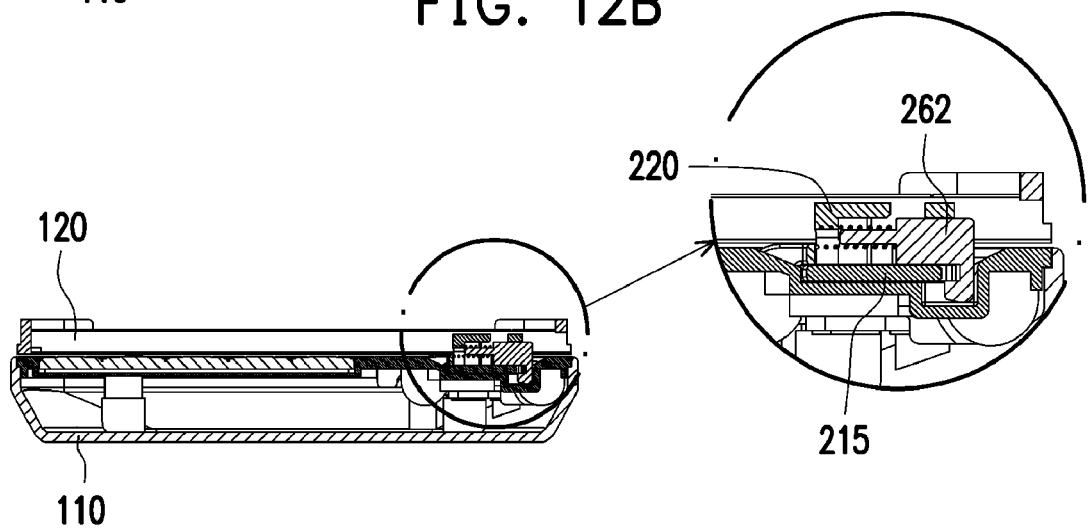
FIG. 12C is a cross-sectional view taken along line 12C-12C in FIG. 12A.
Figure 13C:
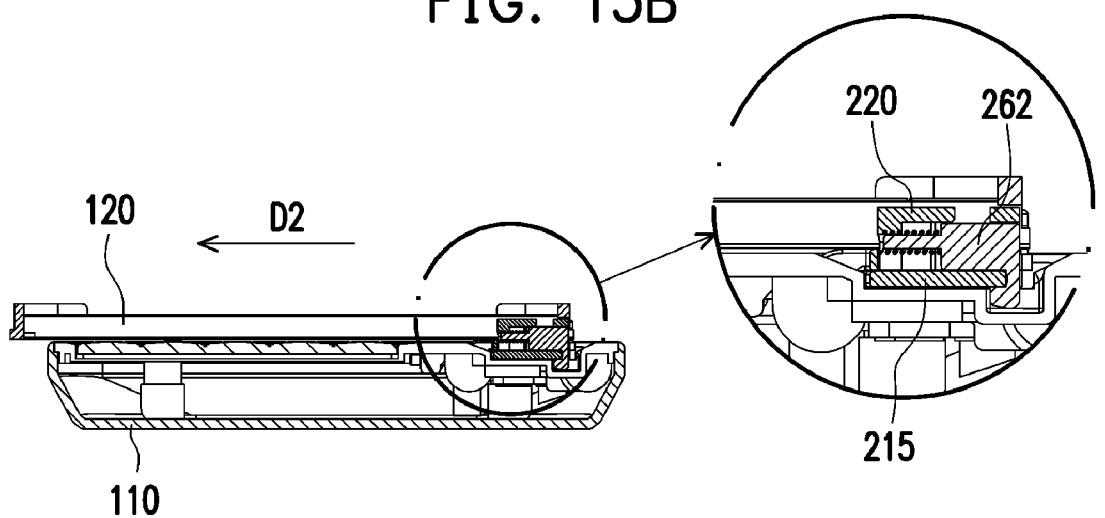
FIG. 13C is a cross-sectional view taken along line 13C-13C in FIG. 13A.

FIG. 12C is a cross-sectional view taken along line 12C-12C in FIG. 12A. FIG. 13C is a cross-sectional view taken along line 13C-13C in FIG. 13A. Referring to FIG. 12C and FIG. 13C, the movement of the upper body 120 relative to the lower body 110 drives the side latches 262 to latch the middle base 215 and the lower base 220.

Figure 14C:
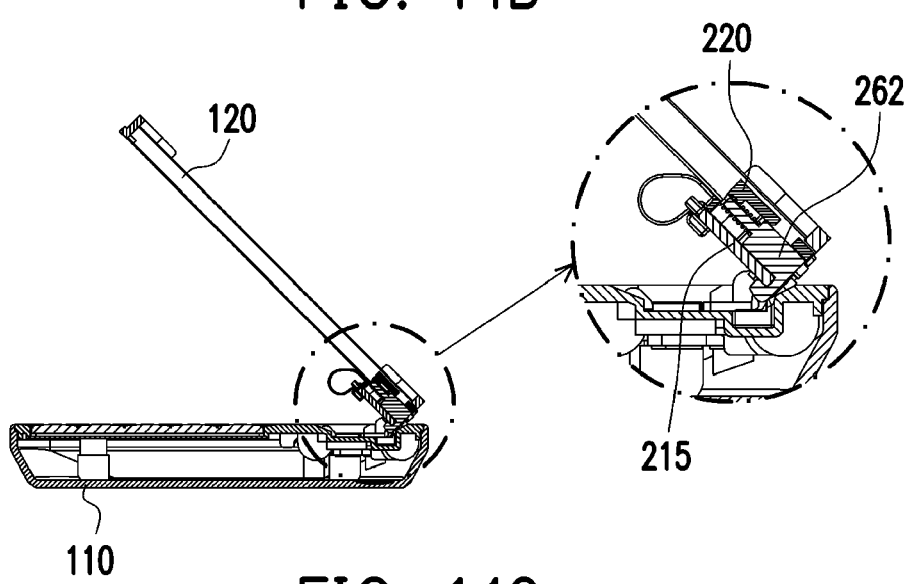
FIG. 14C is a cross-sectional view taken along line 14C-14C in FIG. 14A.

FIG. 14C is a cross-sectional view taken along line 14C-14C in FIG. 14A. Referring to FIG. 13C and FIG. 14C, in the process of rotating the upper body 120, the middle base 215, and the upper base 220 relative to the lower body 110 and the lower base 210, the side latches 262 need to latch the middle base 215 and the upper base 220.

Referring to FIG. 5 and FIG. 8, to ensure the side latches 262 are latching the middle base 215 and the upper base 220, the moving assembly 200 further includes a plurality of brakes 264 that are disposed on the upper body 120. In the present embodiment, the brakes 264 and the driver portions 244 are respectively formed as a single unit.

Figure 12D:
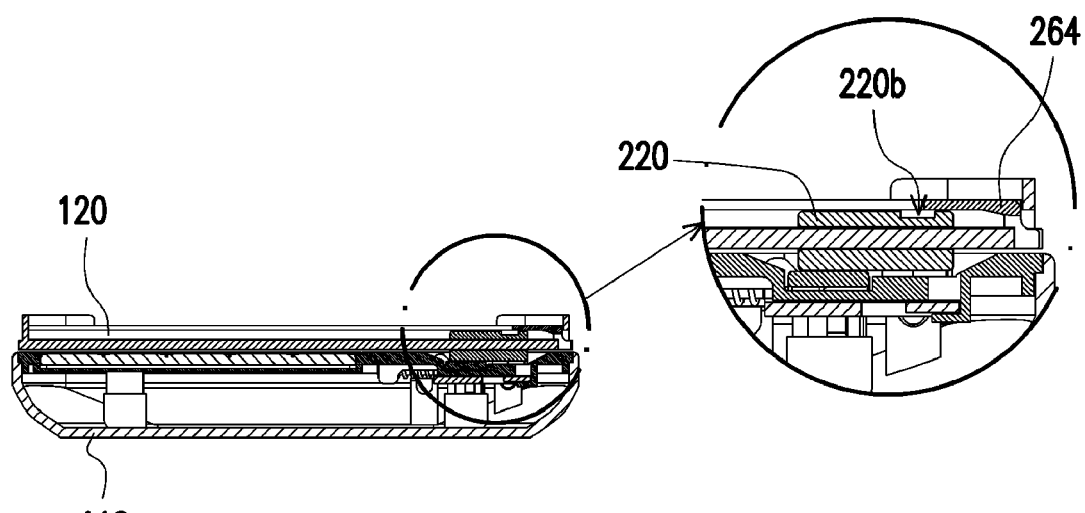
FIG. 12D is a cross-sectional view taken along line 12D-12D in FIG. 12A.
Figure 13D:
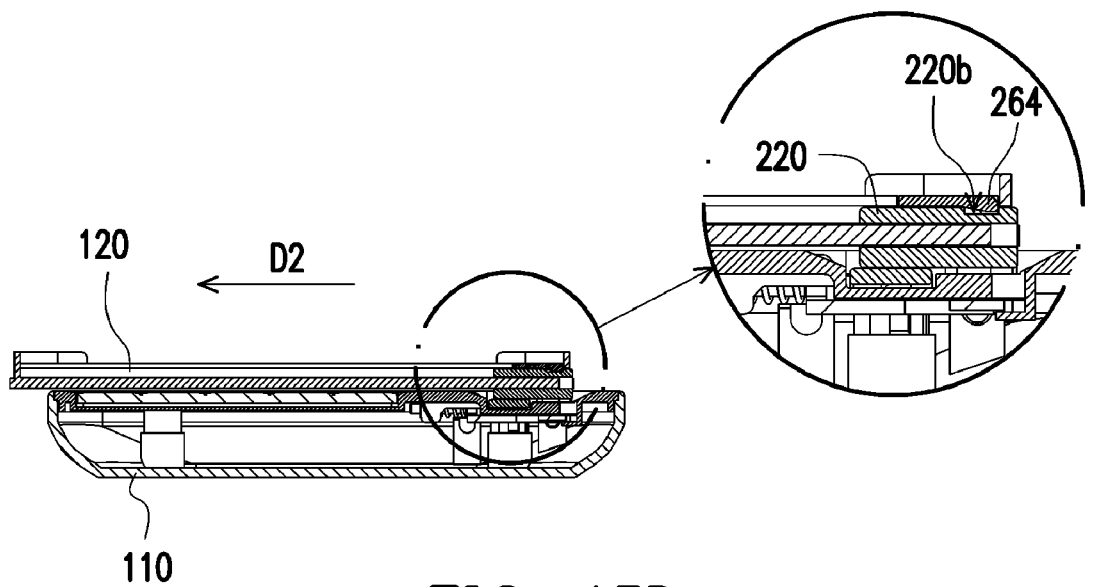
FIG. 13D is a cross-sectional view taken along line 13D-13D in FIG. 13A.

FIG. 12D is a cross-sectional view taken along line 12D-12D in FIG. 12A. FIG. 13D is a cross-sectional view taken along line 12D-12D in FIG. 12A. Referring to FIG. 12D and FIG. 13D, in the present embodiment, the movement of the upper body 120 relative to the lower body 110 causes the brakes 264 to respectively latch a plurality of recesses 220b of the upper base 220. Hence, the relative movement between the upper body 120 and the upper base 220 is limited and the latching of the middle base 215 and the upper base 220 by the side latches 262 is ensured.

Figure 14D:
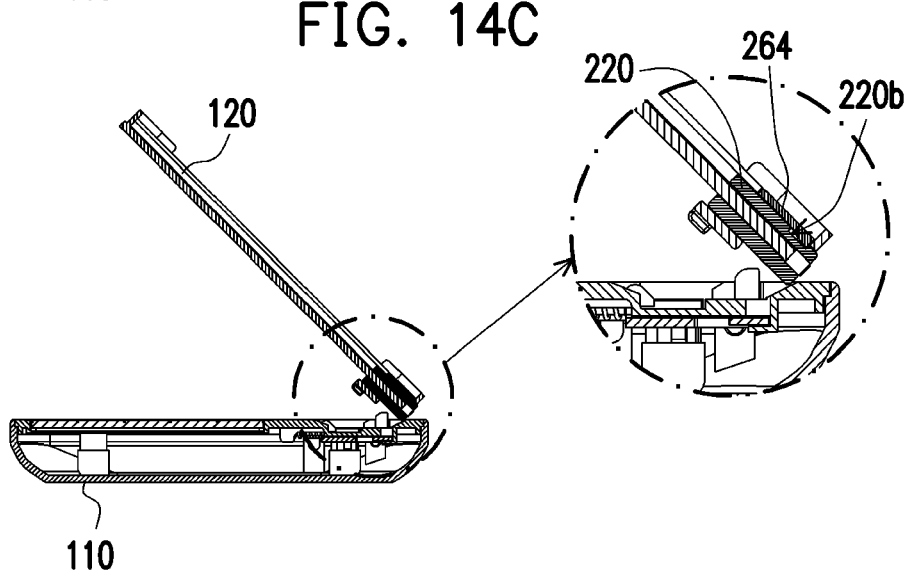
FIG. 14D is a cross-sectional view taken along line 14D-14D in FIG. 14A.

FIG. 14D is a cross-sectional view taken along line 14D-14D in FIG. 14A. Referring to FIG. 13D and FIG. 14D, in the process of rotating the upper body 120, the middle base 215, and the upper base 220 relative to the lower body 110 and the lower base 210, the brakes 264 are still respectively latched to the recesses 220b of the upper base 220.

In order for the upper body 120 to move to the left side as shown in FIG. 13A. Referring to FIG. 5 and FIG. 12A, the moving assembly 200 further includes a plurality of second elastic members 272 and a position-limiting member 274. Here, the second elastic members 272 and the position-limiting member 274 are disposed within the upper body 120, and the position-limiting member 274 is coupled to the upper body 120 through the second elastic members 272. When the upper body 120 changes to the close mode, the position of the upper base 220 is limited by the position-limiting member 274. Hence, the upper base 220 and the inside wall of the upper body 120 maintain a distance as shown in FIG. 12A.

Referring to FIG. 12A and FIG. 13A, the position-limiting member 274 can limit the position of the upper base 220 under the close mode. Therefore, the upper body 120 can move to the left side of FIG. 13A and cause the upper base 220 to contact the inside wall of the upper body 120. At the time, the side latches 262 latch the middle base 215 and the upper base 220 as shown in FIG. 13C. Moreover, the driver portions 244 also push the lower latches 242, so that the lower latches 242 are not latched to the middle base 215.

Referring to FIG. 12B and FIG. 14B, when the middle base 215 rotates close to the lower latches 242, the middle base 215 can push the lower latches 242 through inclined plane motion to recover the latch of the lower latches 242 and the middle base 215.

In the present embodiment, the first open mode exposes the keyboard module 112, so a user can perform character input or touch-control operation. Furthermore, for the convenience of playing videos or multimedia files, the user will only see the display module 122 without seeing the keyboard module 112 under the second open mode. In short, when the upper body 120 of the portable electronic device 100 moves to the right side or the left side, the upper body 120 will tilt with respect to the lower body 110.

In light of the foregoing, in the present application, the upper body may be under the close mode, the first open mode, and the second open mode relative to the lower body through the moving assembly. Hence, the present invention may have a plurality of operation modes and correspond to a plurality of software modes.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A portable electronic device, comprising:
    a lower body;
    an upper body; and
    a moving assembly, installed between the upper body and the lower body, the moving assembly having:
        a lower base, fixed to the lower body;
        a middle base, pivoted to the lower base along a first axis; and
        an upper base, pivoted to the middle base along a second axis substantially parallel to the first axis, and the upper base slidable with respect with the upper body,
    wherein the upper body stacks on the lower body when the moving assembly is under a close mode,
    the upper body is tilted relative to the lower body through the moving assembly by shifting the upper body along a first direction and then rotating the upper body relative to the lower body when the moving assembly is from the close mode to a first open mode,
    the upper body is tilted relative to the lower body through the moving assembly by shifting the upper body along a second direction and then rotating the upper body relative to the lower body when the moving assembly is from the close mode to a second open mode, and
    the first direction is opposite to the second direction.

2. The portable electronic device of claim 1, wherein the moving assembly further comprises:
    a lower latch, slidably connected to the lower body; and
    a driver portion, installed to the upper body, wherein the latching of the middle base and the lower body by the lower latch is relieved by the driver portion through the movement of the upper body relative to the lower body.

3. The portable electronic device of claim 1, wherein the moving assembly further comprises:
    a first elastic member, disposed between the lower base and the middle base to drive the middle base to rotate along the first axis relative to the lower base.

4. The portable electronic device of claim 1, wherein the moving assembly further comprises:
    a side latch, slidably connected to the upper base, wherein the movement of the upper body relative to the lower body drives the side latch to latch the middle base and the upper base; and
    a brake, installed to the upper body, wherein the movement of the upper body relative to the lower body drives the brake to ensure the middle base and the upper base are latched by the side latch.

5. The portable electronic device of claim 1, wherein the moving assembly further comprises:
    a second elastic member, disposed between the upper body and the upper base to buffer the movement of the upper body relative to the upper base.

6. The portable electronic device of claim 5, wherein the moving assembly further comprises:
    a position-limiting member, slidably connected to the upper body, and position-limited by the upper base, wherein the elastic member is disposed between .the upper body and the position-limiting member.

* * * * *